United States Patent
Munkes et al.

(10) Patent No.: US 10,685,313 B2
(45) Date of Patent: Jun. 16, 2020

(54) SYSTEMS AND/OR METHODS FOR PATH FINDING ON MODEL STRUCTURES

(71) Applicant: SOFTWARE AG, Darmstadt (DE)

(72) Inventors: Ralf Werner Munkes, Woelfling-les-Sarreguemines (FR); Markus Werner, Zweibruecken (DE); Stefan Ruschel, Schmelz (DE)

(73) Assignee: SOFTWARE AG, Darmstadt (DE)

( * ) Notice: Subject to any disclaimer, the term of this patent is extended or adjusted under 35 U.S.C. 154(b) by 781 days.

(21) Appl. No.: 13/715,149

(22) Filed: Dec. 14, 2012

(65) Prior Publication Data
US 2014/0173488 A1    Jun. 19, 2014

(51) Int. Cl.
*G06Q 10/06* (2012.01)

(52) U.S. Cl.
CPC .................. *G06Q 10/067* (2013.01)

(58) Field of Classification Search
CPC ......... G06Q 10/06; G06Q 50/01; G06F 17/30
USPC ..................... 705/7, 7.11; 707/748
See application file for complete search history.

(56) References Cited

U.S. PATENT DOCUMENTS

| | | | |
|---|---|---|---|
| 7,702,620 B2 | 4/2010 | He et al. | |
| 8,773,437 B1* | 7/2014 | Goldman | G06Q 50/01 345/440 |
| 2005/0033725 A1* | 2/2005 | Potter | G06F 17/30604 |
| 2006/0218111 A1* | 9/2006 | Cohen | 706/45 |
| 2010/0153832 A1* | 6/2010 | Markus et al. | 715/205 |
| 2012/0280999 A1* | 11/2012 | Nachmanson | G06T 11/206 345/440 |
| 2012/0317121 A1* | 12/2012 | Fuchs et al. | 707/741 |
| 2012/0317149 A1* | 12/2012 | Jagota | G06F 17/30958 707/798 |
| 2013/0254213 A1* | 9/2013 | Cheng | G06Q 50/01 707/748 |
| 2013/0282813 A1* | 10/2013 | Lessin et al. | 709/204 |

OTHER PUBLICATIONS

Software AG. ARIS Business Optimizer: Cost Retrieved Transparency for Process Planning and Controlling. Retrieved Dec. 14, 2012. http://www.softwareag.com/corporate/images/SAG_ARIS_BusOptim_FS_Aug10-web_tcm16-76771.pdf.

(Continued)

*Primary Examiner* — Nga B Nguyen
(74) *Attorney, Agent, or Firm* — Nixon & Vanderhye, P.C.

(57) ABSTRACT

Certain example embodiments described herein relate to defining relevant data for analysis and reporting for modeled processes and process-related data. In certain example embodiments, a normal (and potentially-non-expert) user can define a model, object, or a relation as "source" and "target" of interest. The user also may be able to make a question more concrete, e.g., by specifying stopovers, a number of steps that might be between the source and the target, etc. A net of different paths from the source to the target may be retrieved as result, representing all possible relations, including those that are implicit. Such information also can be selectively excluded from the net, e.g., if the user does not want to evaluate same. However, the user can be reasonably sure that all relevant data for analysis has been returned, even though the definition was made without consulting an expert.

27 Claims, 14 Drawing Sheets

(56) References Cited

OTHER PUBLICATIONS

Software AG. ARIS Business Architect & Designer: Design and Analyze Your Business and its Processes. Retrieved Dec. 14, 2012. http://www.softwareag.com/corporate/images/SAG_ARIS_BusArchDesign_FS_Apr12_web_tcm16-78556.pdf.
Software AG. ARIS MashZone: Cool Business Mashups in Minutes. Retrieved Dec. 14, 2012. http://www.softwareag.com/corporate/products/aris_platform/aris_controlling/aris_mashzone/overview/default.asp.
Signavio. Signavio Process Editor. Retrieved Dec. 14, 2012. http://www.signavio.com/products/process-editor/process-modeling/.
BOC Group. Adonias: Software for Business Process Modeling in the Production Environment in the Berlin Administration. Retrieved Dec. 14, 2012. http://translate.google.com/translate?sl=de&tl=en&js=n&prev=_t&hl=en&ie=UTF-8&eotf=1&u=http%3A%2F%2Fwww.boc-group.com%2Finfo-center%2Fnews%2Fread%2Farticle%2Fsoftware-adonis-fuer-die-geschaeftsprozessmodellie2F&act=url.
Mega. Modeling Tools. Retrieved Dec. 14, 2012. http://www.mega.com/en/c/product/p/modeling.
CW Innovations. Innovative Solutions for Casewise Software and EA, BPM and GRC. Retrieved Dec. 14, 2012. http://cw-innovations.de/.
Cogniscape. CogniViz Demo. Retrieved Dec. 14, 2012. http://www.cogniscape.com/ http://cogniscape.com/demo/CVatPW08.swf.
Cogniscape. CogniViz. Retrieved Dec. 14, 2012. http://www.cogniscape.com/.
Opentext. Business Process Solutions. Retrieved Dec. 14, 2012. http://bps.opentext.com/.
SlideShare. SAP NetWeaver Business Process Management 7.2 Process Analytics. Retrieved Dec. 14, 2012. http://www.slideshare.net/darrencrowder/sap-net-weaver-bpm-process-management-72-process-analytics-3549468.
Functions of the BEx Query Designer. Retrieved Dec. 14, 2012. http://help.sap.com/saphelp_nw04/helpdata/en/f1/0a569ae09411d2acb90000e829fbfe/content.htm.
YouTube. BEx Query Designer. Retrieved Dec. 14, 2012. http://www.youtube.com/watch?v=zC0fJzDdNE0.
IBM. Cognos Software: Business Intelligence and Performance Management. Retrieved Dec. 14, 2012. http://www-01.ibm.com/software/de/data/cognos/.
Oracle Business Intelligence Publisher User's Guide. Retrieved Dec. 14, 2012. http://docs.oracle.com/cd/E12096_01/books/PubUser/T421739T423025.htm.
Oracle Business Intelligence Foundation Suite. Retrieved Dec. 14, 2012. http://www.oracle.com/us/solutions/business-analytics/business-intelligence/foundation-suite/overview/index.html.
Michael Fellmann et al., "Process Model Verification with SemQuu," Retrieved Dec. 14, 2012, pp. 231-236. http://subs.emis.de/LNI/Proceedings/Proceedings190/231.pdf.

\* cited by examiner

FIG. 17

```java
/**
 * Path finding strategy that should be used to find different paths from source to target while stopovers must be in
 * between these two. Number of steps between the two must not be exceeded.
 */
public interface IPathFinder {
    /**
     * Finds paths from given source to target while considering stopovers and number of steps between the two
     * and construct a query from found paths.
     * @param p_sourceElement element that serves as a start point for all the paths
     * @param p_stopOverElements elements in between source and target
     * @param p_targetElement element that serves as an end point for all the paths
     * @param p_stepNumber number of steps in between the source and target
     * @return new query constructed from found paths for given attributes
     */
    public IQuery findPaths(
        IPathFinderPathElement p_sourceElement,
        List<IPathFinderPathElement> p_stopOverElements,
        IPathFinderPathElement p_targetElement,
        int p_stepNumber);
} public APathFinderSwingWorkerExecutionTask(IPathFinder p_pathFinder, IPathFinderExecutionData p_executionData) {
    m_pathFinder = p_pathFinder;
    m_executionData = p_executionData;
}

@Override
protected IResultNet doInBackground() throws Exception {
    final IExecutionInput executionInput;
    final IPathFinderPathElement sourceElement = createElement(m_executionData.getSource());
    final IPathFinderPathElement targetElement = createElement(m_executionData.getTarget());
    final List<IPathFinderPathElement> stopOverElements = createElements(m_executionData.getStopOvers());
    final int stepLimit = m_executionData.getStepLimit();

final IQuery query = m_pathFinder.findPaths(sourceElement, stopOverElements, targetElement, stepLimit);
    if (isCancelled() || query == null) {
        return null;
    }

Logger.getLogger(getClass().getName()).info("Query created:\n" + AUtils.toString(query));
    executionInput = createExecutionInput(query);

final IExecutionResult executionResult = AClientServiceProvider.getInstance().getExecutionService().execute(query, executionInput);
    if (isCancelled() || executionResult == null) {
        return null;
    } return new AResultNet(executionResult, new AAnalysisNodeTypeDefinition(m_executionData.getStopOvers(), m_executionData.getTarget()));
}
```

SYSTEMS AND/OR METHODS FOR PATH FINDING ON MODEL STRUCTURES

TECHNICAL FIELD

Certain example embodiments described herein relate to systems and/or methods for path finding on model structures. More particularly, certain example embodiments relate to finding paths between source and target elements in a model, using an excluding approach in which a complete list of paths from a source item to a target item is specified, and after which a user has the ability to filter out paths, objects, and/or other elements that are not of interest.

BACKGROUND AND SUMMARY OF EXAMPLE EMBODIMENTS OF THE INVENTION

Companies that use Business Process Management (BPM) and/or other modeling tools oftentimes produce a lot of information, e.g., in the form of various models. These models may be used in many scenarios, not only as a description of the most important processes, but also potentially in implementing processes, controlling the daily business in the company, etc. Over the years, modeled structures have become "fillable" with many different types of detailed information, e.g., on times and other indicators, and now quite often are much more than simple pictures. The ability to provide an ever-growing number of details has concomitantly enabled the target group of users of the models to grow. Indeed, various roles in a company frequently involve information on modeled processes, even without the express knowledge that the associated data is based on models. Consider, for example, that for published information, reports, and/or the like, model content may be distributed through the whole company and/or to external consumers.

Models (e.g., process models such as, for example, event-driven process chain or EPC models, organizational charts, etc.) frequently include objects and relations between these objects. It might happen that objects occur in various models and that they have many relations to other objects that also occur in various models. Because of such relations or occurrences in the same models, the existence of common related objects, etc., indirectly related objects sometimes may belong in the same context for an evaluation. Such indirect relations are also sometimes called implicit relations.

Complex structures such as these frequently are the basis for business questions, e.g., for key performance indicator (KPI) calculations on costs and resources of a process, reports like role descriptions, and/or other forms of ad hoc analysis. An example for such business questions could be phrased in a very simple form, such as: "Which functions are executed by Person A?" There are, however, many possible results. For instance, Person A could be related to functions via certain relations such as, for example: Person A executes the function; Person A contributes to the function; Person A is responsible for the function; Person A must be informed about the function; and so on.

But the person could also be responsible for a process, with the functions being in the sub-process. This might be relevant in some scenarios and could be an example of an implicit relation. Another implicit relation could be that the person has certain roles, and the roles are related to functions. There are other possibilities, as well, but without exact knowledge of all variants, it oftentimes is difficult if not impossible for a normal business user to evaluate such structures (e.g., without the help of an expert). Indeed, the number of different methodic information forms (e.g., relation type, model types, symbols, and so on) may make it difficult, to define the correct set of information that is needed to make a correct analysis.

Because strategic decisions in companies are often based on such analyses, it oftentimes is desirable to have the right data and the complete data. To evaluate such a complexity today, experts with programming knowledge frequently are consulted, e.g., to define the various output formats and to evaluate the data to retrieve all necessary information. The approach of defining the right data could be described as "additive" approach. Today's approaches are generally "additive" in nature: Step-by-step, the right set of data is defined by a user. Depending on the user's knowledge of the methodology, this may take several iterations or—in the worst case—might be impossible for an end user.

Some approaches involve the formulation of queries on modeled structures. In such cases, the queries quite often are based on a functional specification that is then implemented using a scripting language such as, for example, JavaScript, SQL statements, XML, etc. Unfortunately, however, query definition is generally limited by the designer's knowledge of the methodology. Graphical query definition sometimes is possible. But even in this case, there also generally needs to be a complex mapping between the graphical representation and the methodology that is used, and a change in the methodology needs to be reflected in the mapping for the definition to remain in working order. As a result, existing technologies generally are limited by the amount of knowledge a query definer has and, even when a person is an "expert," the knowledge might not be sufficient for a given task. Indeed, many commercially available products produce output for business users, but experts typically are needed to retrieve the necessary data, since the output is driven by complex scripting languages, SQL statements, etc.

Reporting based on scripting languages, for example, generally will involve a change to the underlying script(s) if the modeling conventions change. In such cases, it typically is not possible for an average business user to change the report structure in a way that guarantees that the new conventions are directly adapted. Instead, each change typically involves programming effort and costs. And where editors are used, an expert's knowledge oftentimes is needed to identify those parts of the methodology that need to be adapted. Moreover, if Business Intelligence (BI) tools are used, the modeled data oftentimes needs to be "translated" via SQL or XML. Changes in the data therefore will involve a new export from the modeling tool to the BI tool, and changes in the modeling conventions will, in turn, generally involve a change in the mapping format and involve at least some form of programming effort. In the case of a query editor, a certain format of building queries typically must be learned.

It is believed that current approaches do not guaranty a generic usage. For instance, depending on the topic, a certain evaluation may need to be defined, a certain set of the methodological information may need to be mapped to the evaluation approach, etc.

And with each change in the methodology or the modeling conventions on which the query is defined, the query may need to be adapted. There are even scenarios that will require the editor to be changed. The consistency of the results cannot always be guaranteed in such situations.

These changes can result in even more disadvantages. For example, it oftentimes is not possible for a user to differentiate if a change in the modeling or the modeling convention will require an adaptation to retrieve another result. There accordingly may be a large amount of wasted effort associated with answer the question as to whether it is necessary to react on a renaming of a type, a new symbol, a new maintained attribute, etc. As another example associated with the additive approach, the user may have to try to find out (e.g., by trial-and-error) what is missing, and the user may have to add the missing artifacts from the modeling to the query definition—even though it may not be possible to make a live evaluation of the data.

FIG. 1 helps to illustrate a problem with state of the art technology. The query only knows the pattern that follows the modeling restrictions from type A to type B. Using such a query, the result may only contain B1, which is an instance of type B. Object B1 will be found by the query, as only this pattern (shown in the middle path) is covered by the query. The objects B2 and B3, both of type B, will be missing in the result, although there is a possible path from A to these objects. In the best case, the user may recognize that B2 and/or B3 is/are missing. In this scenario, the user will have to change the query by adding the patterns to the query that will lead to B2 and B3. A common problem exists, however, because the user probably will not know about B2 and B3 in complex databases. That is, the user may not see that they exist, the user may not see that there are "relations" that can connect A with B2 and B3, etc. Such a specific evaluation may not be complete, or the complexity of modeling may need to be reduced to retrieve correct results. But doing so may cause a large amount of redundant modeling information.

Thus, it will be appreciated that there is a need in the art for a path finding technique, where a potentially non-technical end-user can define the whole data set that is needed by using a normal model design methodology and where the user is presented with a repeatable analysis and an output.

One aspect of certain example embodiments relates to a new way of defining relevant data for analysis and reporting for modeled processes and process-related data. Similar to a car navigation system, in certain example embodiments, all possible "routes" between a source object and a target object are identified, and the user is able to select one or more routes of potential interest. The user does not, however, have to leave the "modeling environment" and can use well-known terms for the definition.

Another aspect of certain example embodiments relates to following and tracing paths of interest between two given objects, even when there are many complex paths therebetween, e.g., by enabling a user to potentially iteratively exclude possible paths without a detailed knowledge of the underlying model(s), system architectures, etc.

Another aspect of certain example embodiments relates to an "excluding" or "subtractive" approach for limiting the paths from a source object to a target object, e.g., after a complete map of such is developed.

Still another aspect of certain example embodiments relates to the definition of limiting criteria for excluding possible paths from a net of all possible paths. Such limiting criteria may include, for example, specification of maximum path length, indications of required stopovers, use of existing filtering technologies, etc., to "fade out" irrelevant paths and/or paths that are not of interest to a user.

In certain example embodiments, a path finding method for use with a model comprising a plurality of objects is provided. Input specifying a source object and a target object is received, from a user and via a user interface. A net representing at least all methodic-level objects in the model being a step of at least one path between the source object and the target object, and all relationships between these methodic-level objects in the model, is developed. A list of paths, through the net, from the source object to the target object, is compiled, with each said path having a path length associated therewith. Individual ones of said paths that fail to meet one or more user-specified limitations are excluded from the list of paths and in connection with at least one processor. The one or more user-specified limitations includes a maximum path length, at least one stopover item that must be present between the source and target objects, and/or at least one attribute-based filter. Following said excluding, the list of paths is displayed to the user in text-based and/or graphical form.

In certain example embodiments, a computer system is provided. Processing resources include at least one processor and a memory, and a display also is provided. A data source stores a model comprising a plurality of objects. A user interface is configured to receive input specifying a source object and a target object in the model. The processing resources are controllable to at least: develop a net representing at least all methodic-level objects in the model between the source and target objects, and all relationships between these methodic-level objects in the model; compile a list of paths, through the net, from the source object to the target object, each said path having a path length associated therewith; exclude, from the list of paths, individual ones of said paths that fail to meet one or more user-specified limitations, the one or more user-specified limitations including a maximum path length, at least one stopover item that must be present between the source and target objects, and/or at least one attribute-based filter; and following said excluding, display the list of paths to the user in text-based and/or graphical form on the display.

In certain example embodiments, there is provided a non-transitory computer readable storage medium tangibly storing instructions that, when executed by at least one processor of a system, perform a method as described herein.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 17 is a code extract that represents a path finding strategy that may be used in accordance with certain example embodiments.

DETAILED DESCRIPTION OF EXAMPLE EMBODIMENTS OF THE INVENTION

As described above, the state of the art of performing evaluations on the complex net of objects in the data source involves defining queries or reports, e.g., in the form of SQL statements, XML formats, scripting languages, etc. There are also some graphical systems that support the user defining the evaluations and abstract from the technical side. These approaches involve an iterative, additive process. In this sense, the query or report is performed step-by-step, independent of the used technology. Unfortunately, however, this step-by-step approach typically requires a deep knowledge of the methodology defined by the data source and (in most cases) of the existing modeling conventions in companies. As noted above, there can be a very large number of paths leading from a person to a function. If the user in the step-by-step approach forgets one of the paths, then the result of the evaluation likely will be wrong.

Certain example embodiments alleviate the need to know the complete methodology and may help to move the responsibility for finding all relevant paths to the system. As indicated above, certain example embodiments function like in a car navigation system, in that the user specifies the source and the target object, and the system helps find all possible paths. To reduce the number of found paths (e.g., paths that make no sense in an evaluation), the user can specify stopovers, a maximum number of steps between source and target, etc. The example path finding approach described herein is an "excluding" approach. That is, the user is presented with everything and can exclude what is not needed. By excluding more and more irrelevant data, the underlying query is made more concrete and informative, and better results can be retrieved. Advantageously, the path finding techniques of certain example embodiments may be made to work with virtually any kind of a graph that can be conceived of as items and relations therebetween, and it will retrieve all paths between a source and a target.

Figure 1:
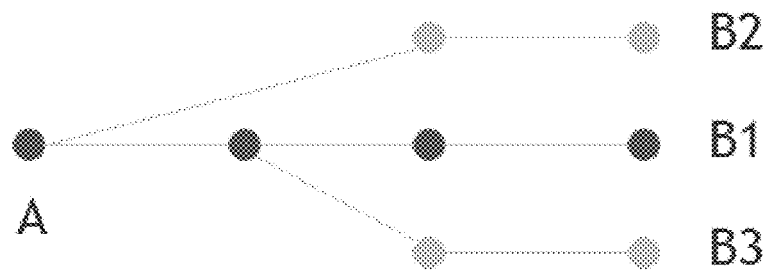
FIG. 1 helps to illustrate a problem with state of the art technology.
Figure 2:
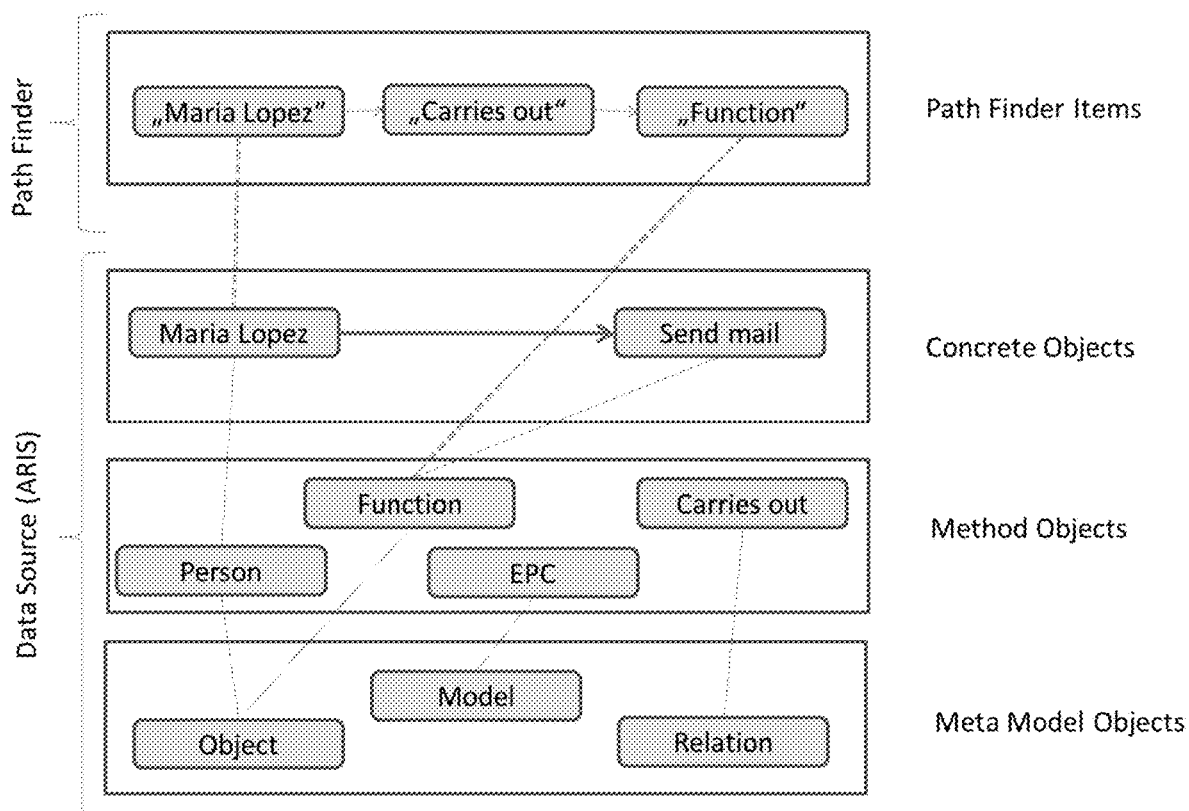
FIG. 2 shows four of the five common levels of objects involved in certain example embodiments.

It will be appreciated that there are many levels (or layers) to a model, and that a report or query may add more levels to the basic foundation. In this regard, FIG. 2 shows four of the five common levels of objects involved in certain example embodiments. Referring now more particularly to FIG. 2, the Meta Model Object Level of a modeling tool describes which kind(s) of modeling objects can be used. In general, these are models, objects, relations (or connections) that can be used. The Method Object Level uses the underlying meta model and describes which specific type(s) of the meta model objects are allowed. The ARIS methodology, for example, defines methodic objects like "EPC", "Value added chain diagram", "Organizational chart", and others, as models. The models may include methodic objects like "Function", "Person", and/or others. Methodic objects may be connected by connections like "carries out", "supports", and/or others.

The user who is using the modeling tool may create concrete objects. As an example, a user may in his/her organizational chart create concrete objects "Maria Lopez" or "Marc Miller" of type "Person". "Person" in this example is the method object, and "Maria Lopez" and "Marc Miller" are concrete objects. It can be seen, then, that concrete objects exist at a different level from method objects in the FIG. 2 example.

Certain example embodiments may interpret methodic objects (potentially independent of their type on the Meta Model Layer) and relations therebetween as a net. This net may in some cases also contain concrete objects. Objects of this net used in the Path Finder are called Path Finder Items in FIG. 2. The result net produced by executing a query defined with the Path Finder contains result items. These result items always correspond to concrete objects, and exist at a Result Items Level (which is not shown in FIG. 2).

Figure 3:
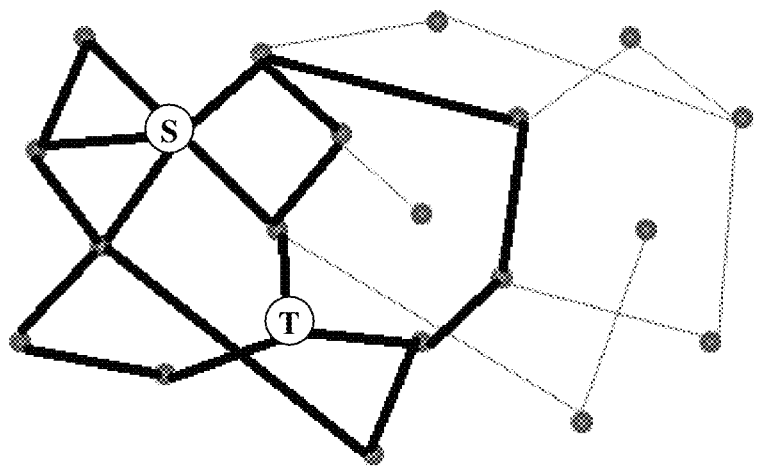
FIG. 3 is an example of a net that includes methodic objects, relations between the method objects, and concrete objects.

The path finding techniques of certain example embodiments begin with the definition of at least a source and a target as indicated above. Also as described above, methodic objects and relations therebetween, together with concrete objects, may be thought of as comprising one net. FIG. 3 is an example of such a net. The dot with the "S" in it is an example for a source item, where the user starts his question, and the dot with the "T" in it is the target item in this example. The very thick and dark relations are paths that lead, more or less, directly from the source item to the target item. All dots in these paths symbolize steps, and may be used to determine the path length. This may be helpful, for example, when a user wants to limit the number of steps to reduce the number of results. It is noted that not all paths in FIG. 3 that lead to the target are marked with heavy, darker lines. This helps to illustrate that where step limits are imposed, some paths will not be relevant for a user.

As described above, the net may include all possible methodic objects. However, it may in some instances contain concrete objects, which in essence are instances of the methodic objects. As a result, it will be appreciated that source and target items may be methodic objects or concrete objects. An example of a question with only methodic objects is, "For a person, show me all application systems that are used by the person to carry out a function." An example of a question with a concrete object as the target item is, "For a person, show me all functions that are carried out by this person and that use ARIS (as a concrete object of object type application system)."

Figure 4:
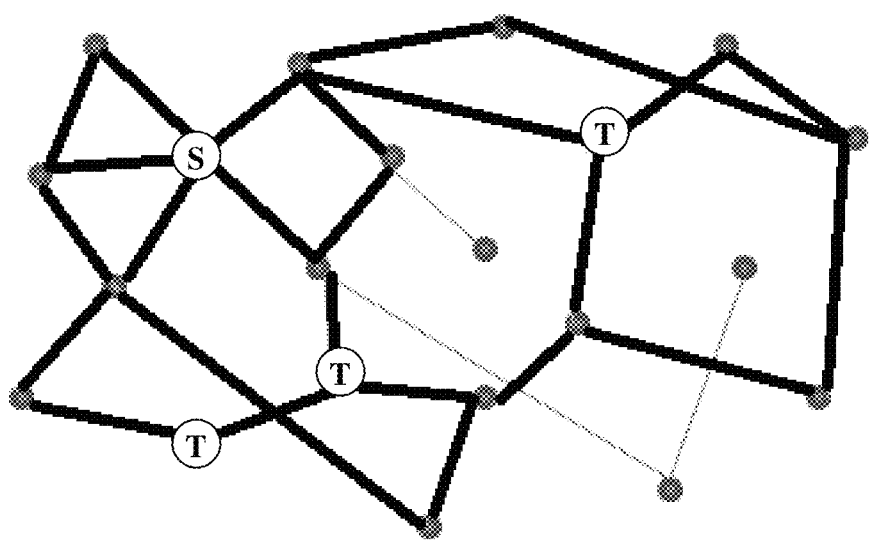
FIG. 4 is an example net with a single source (S) and multiple targets (T)

It therefore will be appreciated that a user may explicitly or explicitly specify one or more targets. FIG. 4 is an example net with a single source (S) and multiple targets (T). Again, the heavy, darker lines represent paths from the source to the targets. Although the "dots" in FIGS. 3 and 4 are distributed at the same general places, the paths have changed in FIG. 4 by virtue of the additionally specified targets T.

Figure 5:
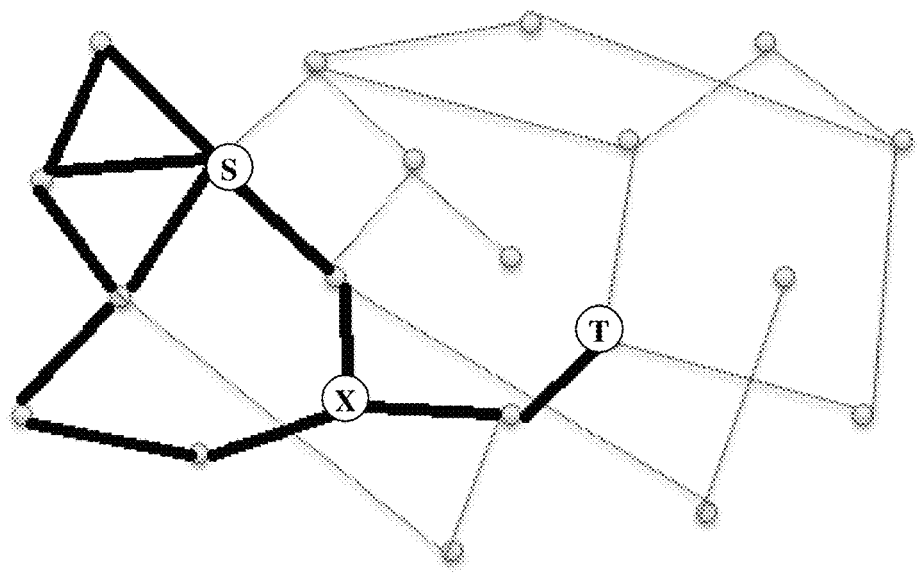
FIG. 5 is an example net with a single stopover (X)

To make the result paths at least somewhat more defined, it is also possible to define one or more stopovers. If the user defines such stopovers, then only paths that contain all of the defined stopovers will be added to the result. Paths that do not contain all stopovers will be ignored. Stopovers may in some instances be methodic objects or concrete objects (e.g., the source is a person S, the target refers to one or more functions T, and the stopover is process X). This is shown schematically in FIG. 5, which is an example net including a stopover X.

An example of a question with a method stopover is, "For a person, show me all application systems that are used by the person to carry out a function that occurs in process diagram." The "process" diagram in this example is a methodic stopover. All paths in the result therefore will contain a process model (assuming that it exists). Objects of type Function, which do not occur in a process model but may be in a function allocation diagram type model, will be ignored.

An example of a question with a concrete stopover is, "For a person, show me all application systems that are used by the person to carry out a function that occurs in the 'sales order process.'" In this example, "sales order process" is a concrete object of type "Process." The result for this question will only consider objects of type "function" that occur in the "sales order process" process model.

It will be appreciated that, in general, the number of interesting paths typically will be reduced by the specification of stopovers. Similarly, the more concretely that the question for the path finding is defined, the lower the number of results will tend to be, at least as a general matter.

Figure 6:
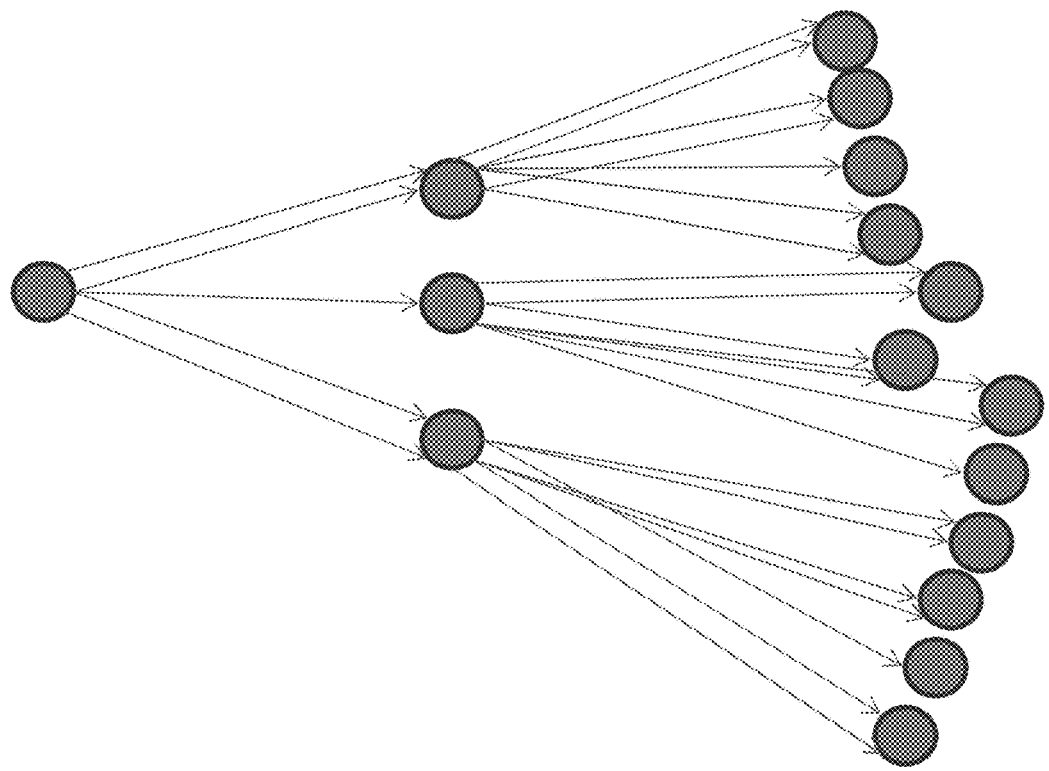
FIG. 6 shows an example result list for a question concerning the functions that are executed by a person, and the applications that are used to execute those functions.

FIG. 6 shows an example result list for a question concerning the functions that are executed by a person, and the applications that are used to execute those functions. That is, FIG. 6 shows the result for the business question, "Which functions are executed by Maria Lopez, and which application is she using for doing that?". The source is a concrete object, and the stopovers and targets are object types with more than one concrete result. The simple example shows that it is possible that the result net can become very complex because many results of a certain item type can lead to many different ones of another type, and so on.

Recognizing the potential for complexity, certain example embodiments provide mechanisms to exclude unimportant information of the net. A user may, for example, limit the path length by specifying the number of steps between a source and a target. As another example, it also is possible in certain example embodiments to reduce the complexity of the net by excluding parts of the method (e.g., certain model types, object types, relation types, and/or the like) from the search, e.g., via a filter list.

Figure 7:
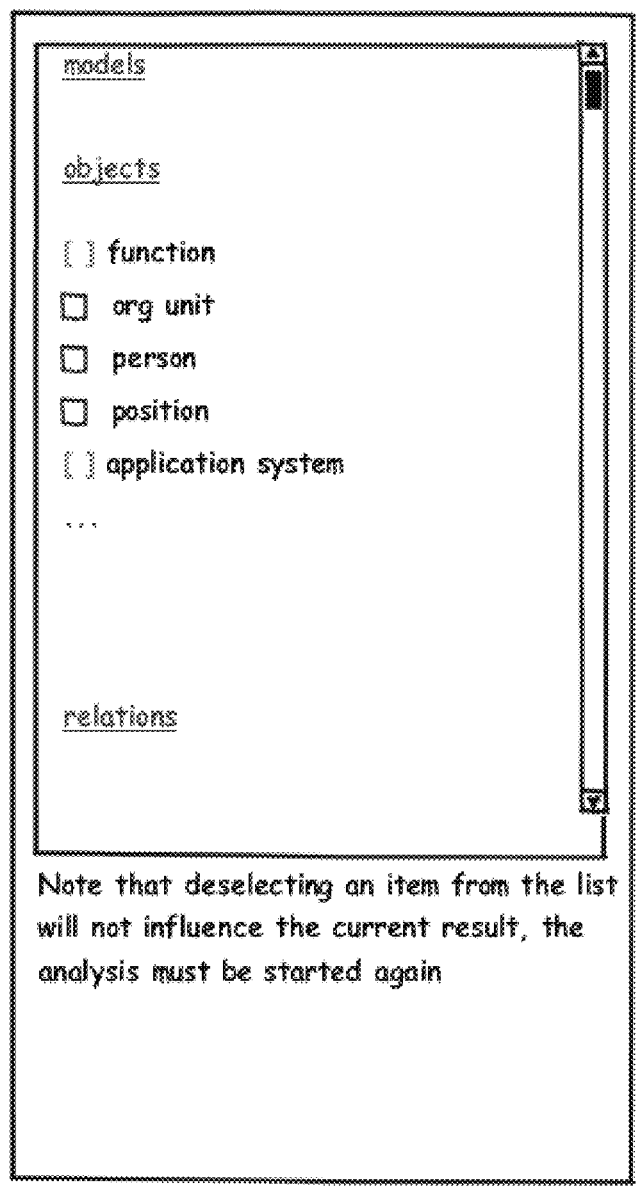
FIG. 7 is an example screenshot of a filter list in accordance with certain example embodiments.

With respect to this latter scenario, FIG. 7 is an example screenshot of a filter list in accordance with certain example embodiments. A user may use a filter list of the sort shown in FIG. 7, for example, in many different ways. For instance, a user could deselect one or more models, objects, and/or relations to help prevent paths involving the same from being generated. The selection or de-selection of one or more items may update the results in real-time in certain example embodiments. However, in certain other example embodiments, it may be necessary to restart the analysis to take into account updated preferences associated with the modified filter list.

Figure 8:
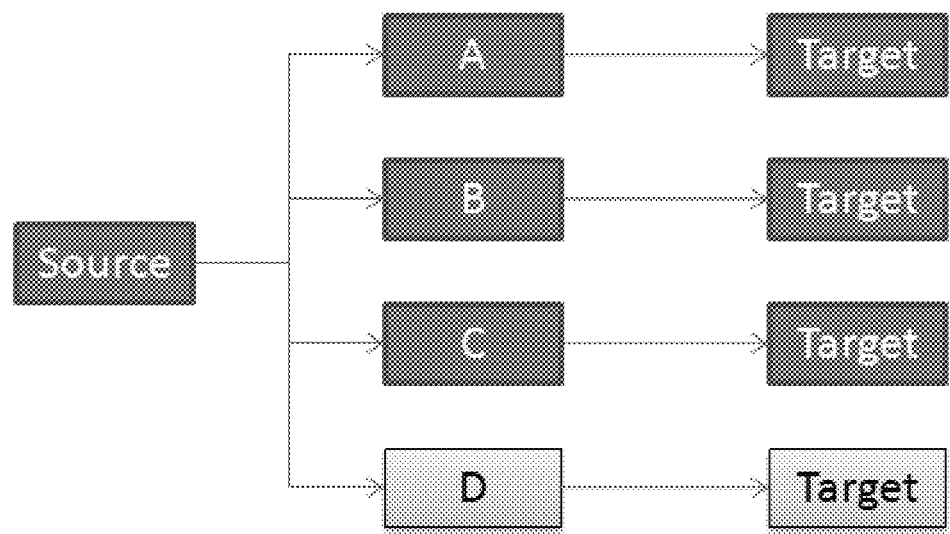
FIG. 8 is a schematic view of a path that has been marked as uninteresting, in accordance with certain example embodiments.

As another example, complete paths that are in the result net could be marked as being not interesting to a user. Such "uninteresting" paths may be remembered for new path finding operations, e.g., so the new path finding operations potentially become less and less complex over time. FIG. 8 is a schematic view of a path that has been marked as uninteresting, in accordance with certain example embodiments. In the FIG. 8 example, the grayed-out path from the source, through D, to the target, is indicating as being an "uninteresting" path. This path may be stored in a suitable storage location and marked accordingly.

Other mechanisms may include, for example, the method filter itself and the database content a user is logged in. A method filter may be thought of as being a set of the method that a user can use during modeling of certain content in the database. ARIS, for example, has a predefined "entire Method", but filters can cover a certain aspect like a UML filter, BPMN filter, and so on. Also, a customer can define his or her own filter, where parts of the method are used and where new user defined object types, model types, relation types, etc., also can be added. Using the method filter therefore may in some instances imply that the user who analyzes given structures can use the same terminology and content as the user who modeled it. This may in some cases limit the number of possible paths from source to target.

Once the final result net is generated, it may serve as the starting point for building visualizations. The user may, for example, create tables, graphics, documents, new models, etc. The user may also save the result and the path finding, e.g., in a suitable data store, so that it can be reloaded and used. The result can also be exported (e.g., for viewing by an external reader, for importing into a different modeling package, etc.) or simply printed.

Figure 9:
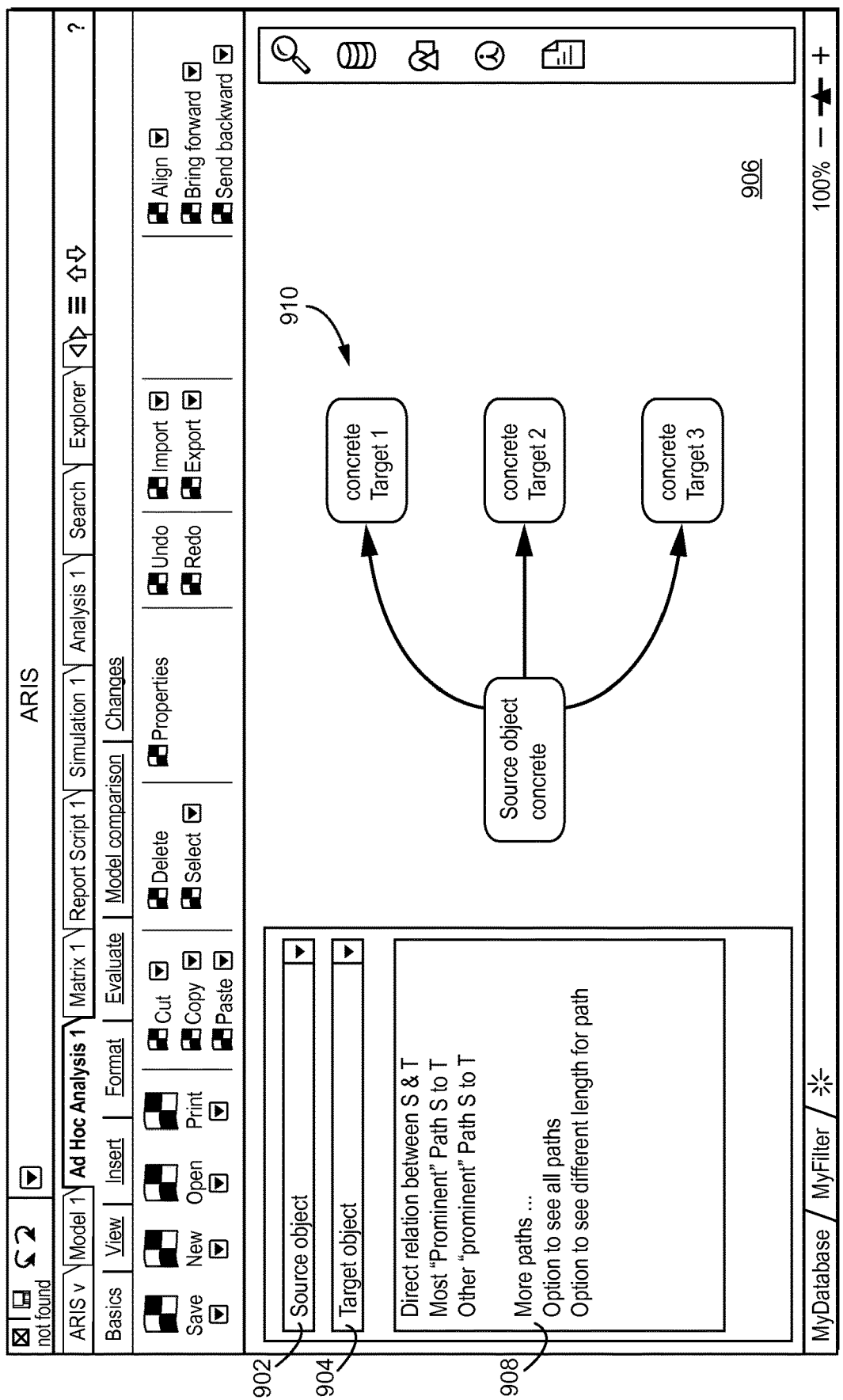
FIG. 9 is an example screenshot for path finding in accordance with certain example embodiments.

FIG. 9 is an example screenshot for path finding in accordance with certain example embodiments. The FIG. 9 example is provided in connection with the ARIS Business Architect product, commercially available from the assignee, although its example techniques can be adapted for use with a variety of commercial and custom packages and other screenshot mockups are of course possible in different example embodiments. In any event, the source and target may be defined, e.g., using the source and target combo boxes 902 and 904, respectively, e.g., in connect with an edit field. In this case, typing the starting letters of the object to be searched for in the edit field may in some instances reduce the number of entries appearing for possible selection in the combo box. Of course, other GUI control elements may be used in different example embodiments.

In the AdHoc Analysis tab, which is the active tab shown in the FIG. 9 example screenshot, the source items may be reduced to concrete objects. In this case, as soon as the concrete source object and the target object (the latter of which can be methodic or concrete) are selected, the system may start searching for all possible paths. The found paths may then be shown in the result window 906. The result may in some instances include only concrete objects. The user can see the result in form of a list 908 and also the in form of a graphical net 910.

If an implementation also allows methodic source items and if the source item is a methodic object, an additional concrete object may be defined in certain example embodiments to help visualize the result net for that object. In this case, the selected concrete object may be helpful for the customer when it comes to evaluating and testing the result net, and also in filtering out what should not be included in the result.

Figure 10:
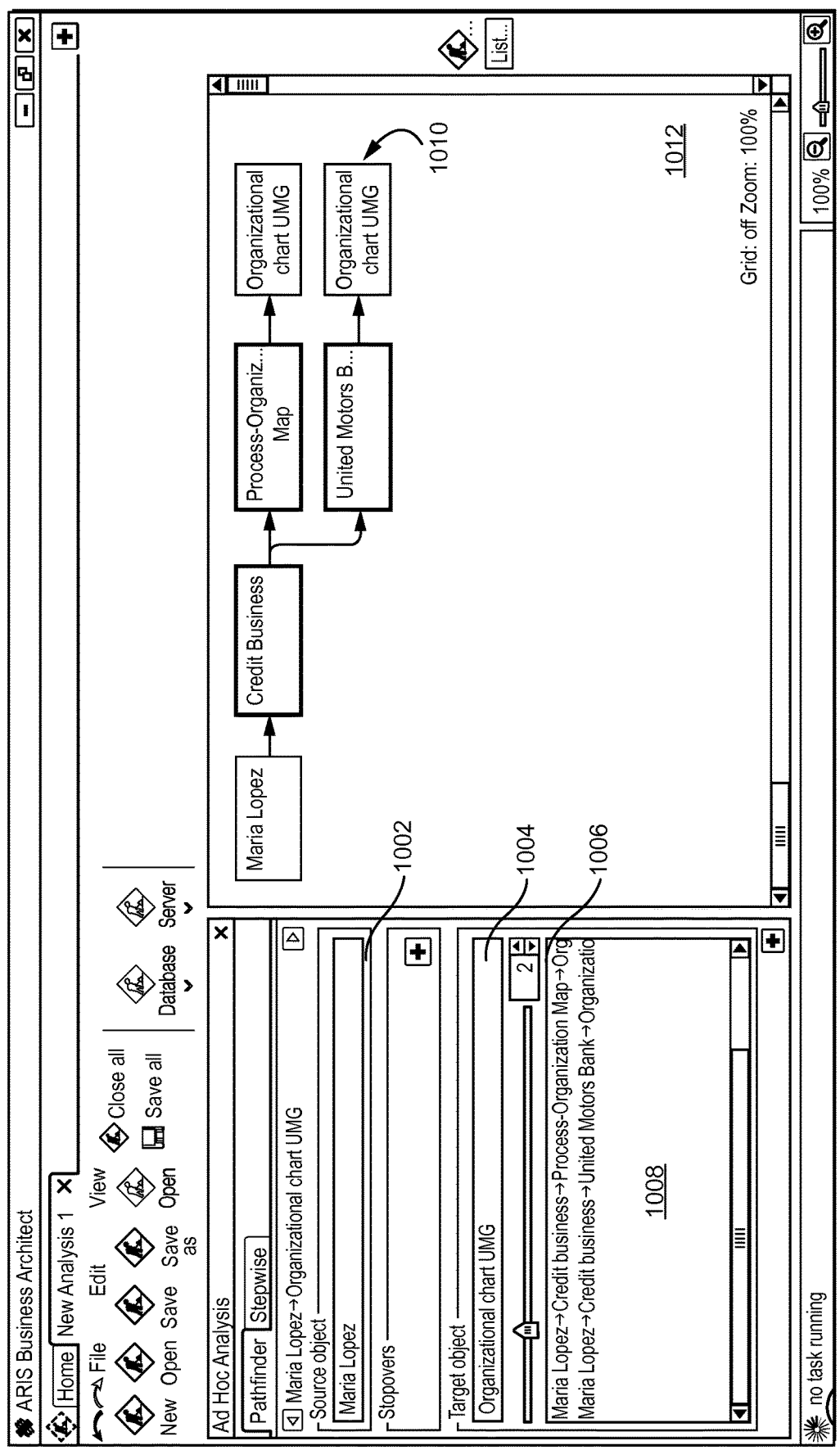
FIG. 10 is an example screenshot of the implementation of the path finding approach of certain example embodiments.

FIG. 10 is an example screenshot of the implementation of the path finding approach of certain example embodiments. Like the FIG. 9 example screenshot, the FIG. 10 example screenshot is appropriate for use in the ARIS environment, although the example techniques may be applied to other environments and the display need not be arranged exactly as shown.

FIG. 10 shows a path finding example without stopovers. "Maria Lopez" is the selected source object, and is a concrete item of item type "Person," as indicated in the source object identifier area 1002. The item could be selected in a model graphic, entered in the source object field, or specified in some other way. The target item is a model and, in this case, is an organizational chart, as indicated in the source target identifier area 1004. The number of steps between source and target is limited to 2 steps, as shown in the step control 1006. This means that a maximum of two items could be between source and target in this example. The slider control, next to the step control, may be used to increase or decrease the number of steps and, in this way, the result graph and the result list may grow or be reduced based on a corresponding manipulation. Single paths of the result could be selected now (in the result list and/or the graph) they could be excluded.

The results of the path finding are shown in the form of a list in list area 1008, with two results below the specified source and target. The results also are shown in the form of a result graph 1010, e.g., in the graphical display area 1012. In the graphical result representation, the source may be designated in a first way (e.g., marked green), and the target may be marked in a second way (e.g., marked red). Items with other marking (e.g., black borders) may represent steps. In the FIG. 10 example, both (red) target objects represent the same concrete object. Since there are two paths from the source item to the target item, the object corresponding to the target occurs twice in the result view, once for each path. The presence of multiple target objects might be a sign of importance of the path, although this may of course vary from situation-to-situation. Certain example embodiments may provide the option (e.g., a pressable button) for reducing objects with more than one occurrence in the result net to one result item in the graphical view, or otherwise indicating that the object can be reached by multiple paths.

It is possible to mix, in a path finding, concrete items (like "Maria Lopez") and item types (such as, for example, "Organizational Chart"), but only concrete items may be shown in the result as indicated above. The arrows in the result graph are directed, from source to target.

Figure 11:
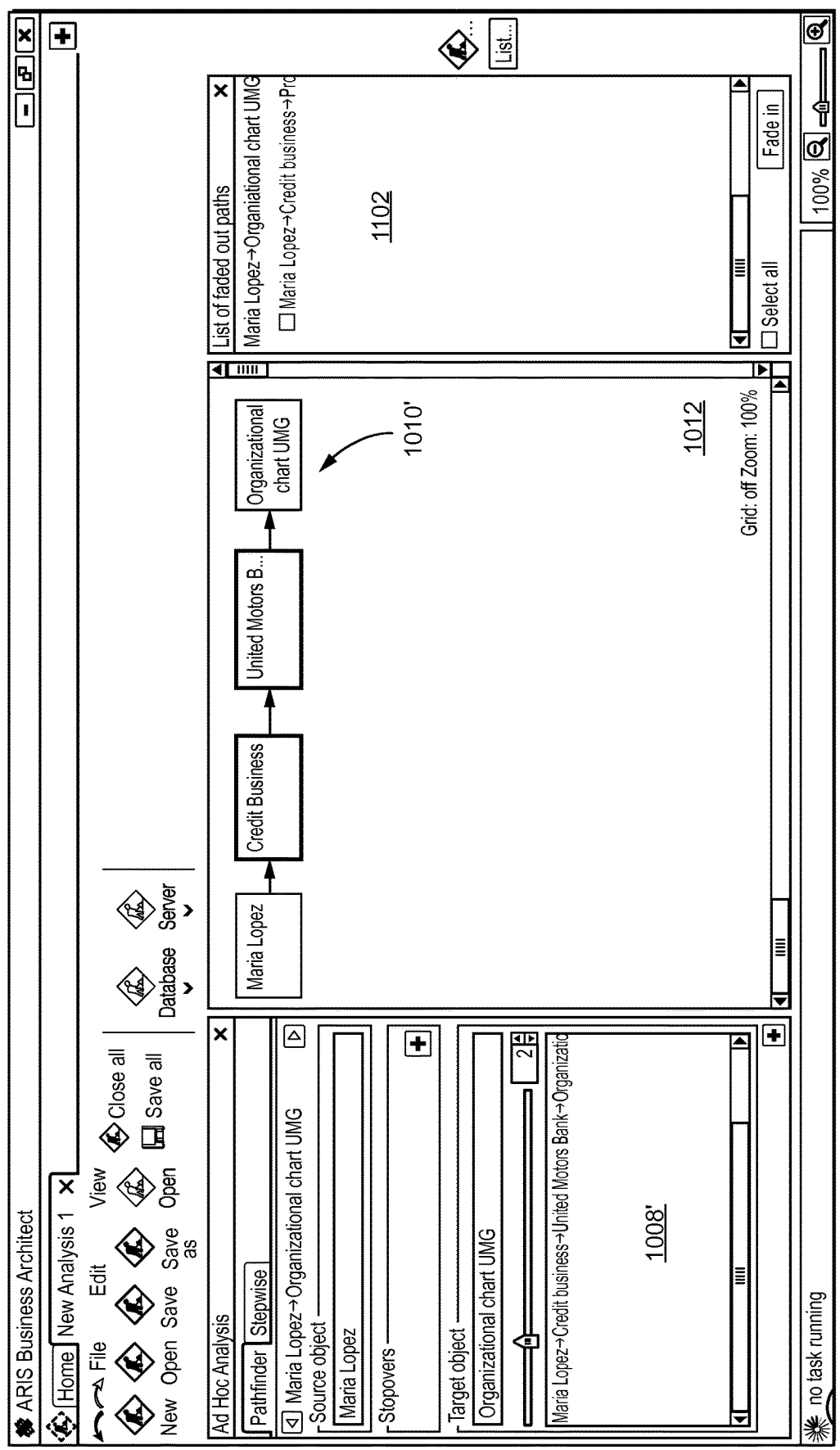
FIG. 11 is an example screenshot demonstrating an illustrative mechanism for excluding paths in accordance with certain example embodiments.

An example mechanism for excluding paths in accordance with certain example embodiments is shown in the FIG. 11 example screenshot. The path finding in the FIG. 11 example is the same as in FIG. 10. However, the result list 1008' is reduced by fading out one found path, and graphical display area 1012 includes the reduced result graph 1010'. The excluded path is shown in the list of faded out paths 1102 on the right-hand side of the example screenshot. This excluded path could be selected from the list 1102 and re-introduced to the result again if the user wants it back.

Figure 12:
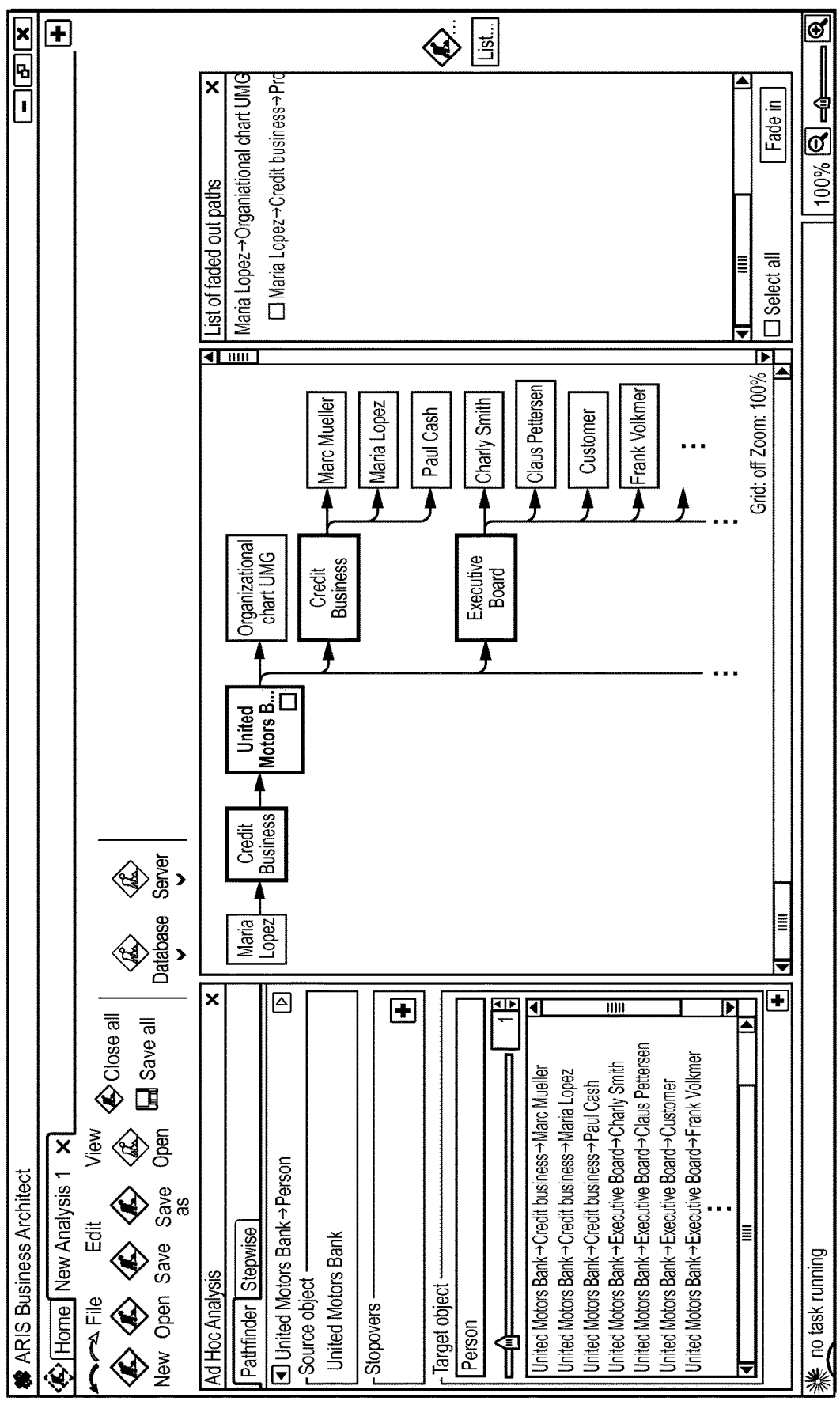
FIG. 12 is an example screenshot showing a second path finding started on the target of a first path finding to demonstrate illustrative concatenation techniques of certain example embodiments.

It also is possible to concatenate different path findings in certain example embodiments, and an example of this functionality is shown in the FIG. 12 example screenshot. In terms of an example concatenation, it is noted that the target of the first path finding may be used to start a second path finding. The target for the second path finding may be user-specified in certain example embodiments. The second path finding in this example has a maximum of one step between source and target (which may or may not be the same as the parent path finding). The result shows, on top, one direct relation to a target and, in addition, a number of paths with one item between source and target.

Figure 13:
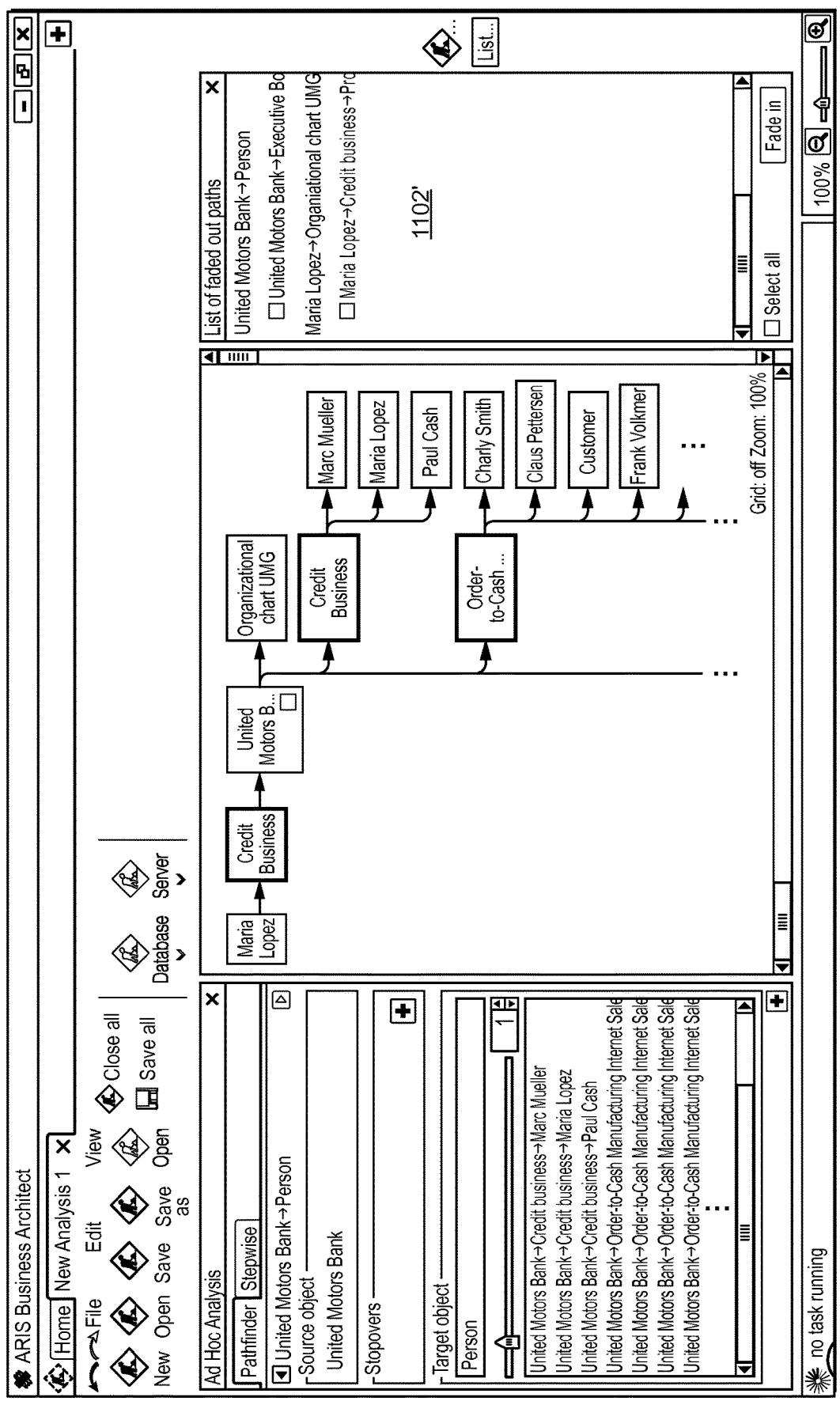
FIG. 13 is an example screenshot showing how the illustrative mechanism for excluding paths of FIG. 11 can be used for concatenated paths in accordance with certain example embodiments.

In such concatenated path findings, it is possible to use the example mechanisms discussed above to reduce the number of results. This is visualized in the FIG. 13 example screenshot. The list of excluded paths 1102' now contains one path from the first path finding and one path from the second path finding.

Figure 14:
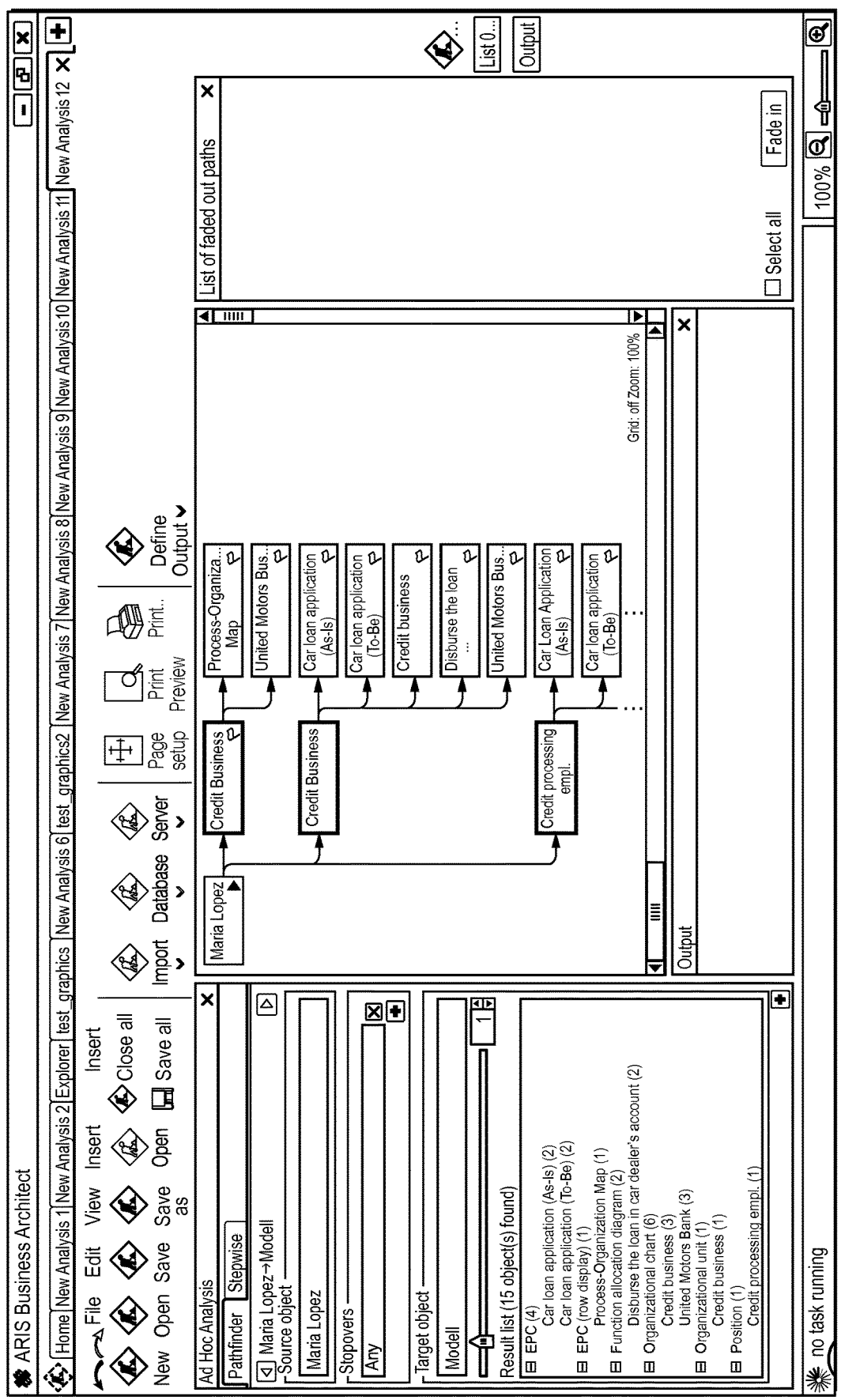
FIG. 14 is an example screenshot showing stopover setup in accordance with certain example embodiments.

To make such a path finding more concrete, one or more stopovers may be defined. An example for such a stopover is shown in the FIG. 14 example screenshot. A name for the stopover may be entered, and in the FIG. 15 example, the user chooses the concrete item "credit business division." This selection leads to the result shown in FIG. 15. The stopover may be marked in the result graph (e.g., as a blue item in the net). All paths must include the stopover by definition. The number of results therefore is reduced drastically compared to the result of the same path finding without stopover in the FIG. 14 example in which the stopover is just being set up. It will be appreciated that it may be possible in certain example embodiments to enter an item type instead of a concrete item, to enter different stopovers, etc.

As described above, certain example embodiments using an excluding approach in which a complete list of paths from a source item to a target item is specified, and after which a user has the ability to filter out paths, objects, and/or other elements that are not of interest. As alluded to above, this filtering may be accomplished in a number of different ways. Certain of these example approaches are elaborated upon, below.

One approach involves the ARIS Filter mechanism, which may in some cases support the user in reducing the complexity of the net. As the methodology of ARIS is quite complex (e.g., in that it includes, for example, the BPMN1, BPMN2, UML, and other methodologies), method filters may be used to reduce the complexity for the user. Some of the filters are already preconfigured, although ARIS users may be able to create their own filters. These method filters in some cases may allow the user to filter out some of the methodic objects. A BPMN2 filter, for example, can be configured to filter out everything that is not covered by BMPN2 (such as, for example, EPCs, etc.). In this context, it has been observed that most of the ARIS customers use their own filters that are adapted to their modeling conventions. In any event, when a user logs in to an ARIS database, for example, the user may first select the filter to be used and, subsequently, this filter may be implemented by the path finder program logic.

Figure 15:
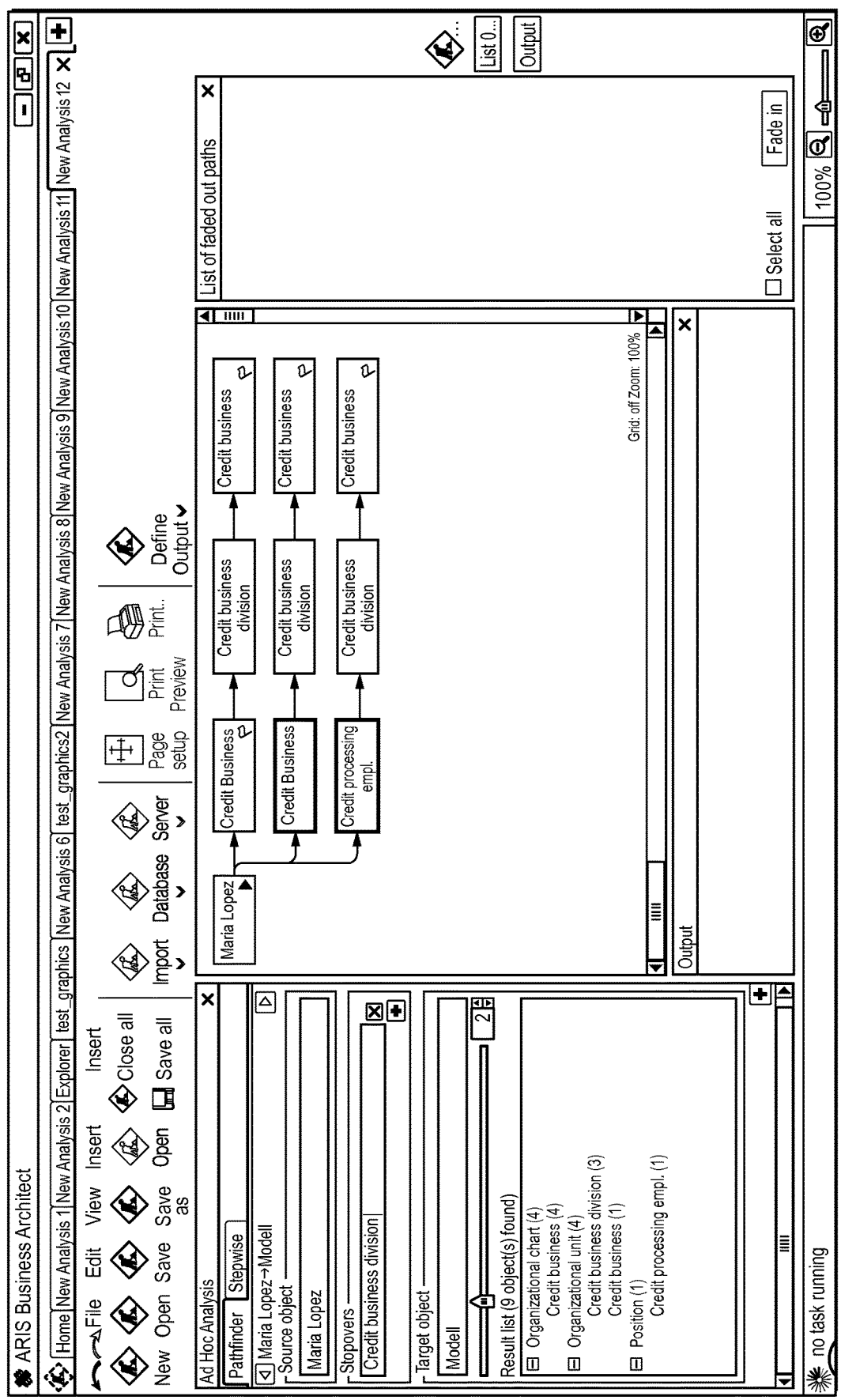
FIG. 15 is an example screenshot showing a stopover in the result net in accordance with certain example embodiments.

As shown in FIG. 15, for example, a list of objects on the paths may be presented to the user. Here, or in the result graph, the user may fade out objects that are to be excluded from the result. This can be performed by calling a method via the context menu, for example. The objects in the list may be sorted by their types in certain example embodiments. For instance, "Marc Miller" and "Maria Lopez" from the previous examples may be listed under an entry entitled "Person." Within the list, it also may be possible to fade out all objects of a specific type, e.g., by clicking on the list entry and calling the context menu accordingly. In certain example embodiments, an additional panel may be provided in the user interface that includes a list of all methodic objects, where the user may filter out some of them by simply selecting or deselecting a checkbox.

Certain example embodiments may enable result objects to be filtered out by attributes. Attributes of an object of type "Person" may be, for example, "Age", "Salary", "Gender", and/or the like. This could also be done in the filter panel for the methodic objects in certain example embodiments.

Compared to a navigation system in a car, the context in which certain example embodiments exist does not guarantee that there is a best way from source to target object. As the direction of the connections between objects is ignored, the result of a search may always include the complete network. The result could even be worse, e.g., because the result could contain recursions.

To reduce the size of the result net, limiting factors may be introduced. These limiting factors may include, for example, limitations on the number of objects found between the source and target; filtering out of paths with recursions and/or loops; the optional definition of stopovers, objects or object types that necessarily have to be contained in a path; and/or the like.

As explained above, parameters for the path finding may include source and target objects, maximum step size, and a list of one or more stopovers. The source object preferably is a concrete object (in the example above, "Maria Lopez" would be allowed, and "Person" as a non-concrete object would not be allowed but could be dealt with in other ways). The target object may be a concrete object or a non-concrete object. The maximum step size may be an integer or other numerical value that defines the maximum length of path in the result net. It will be appreciated that the path length property would be, at the maximum, step size+2, the +2 corresponding to the source and target objects. The list of stopovers is optional and, thus, can be empty. It may include concrete or non-concrete objects.

Figure 16:
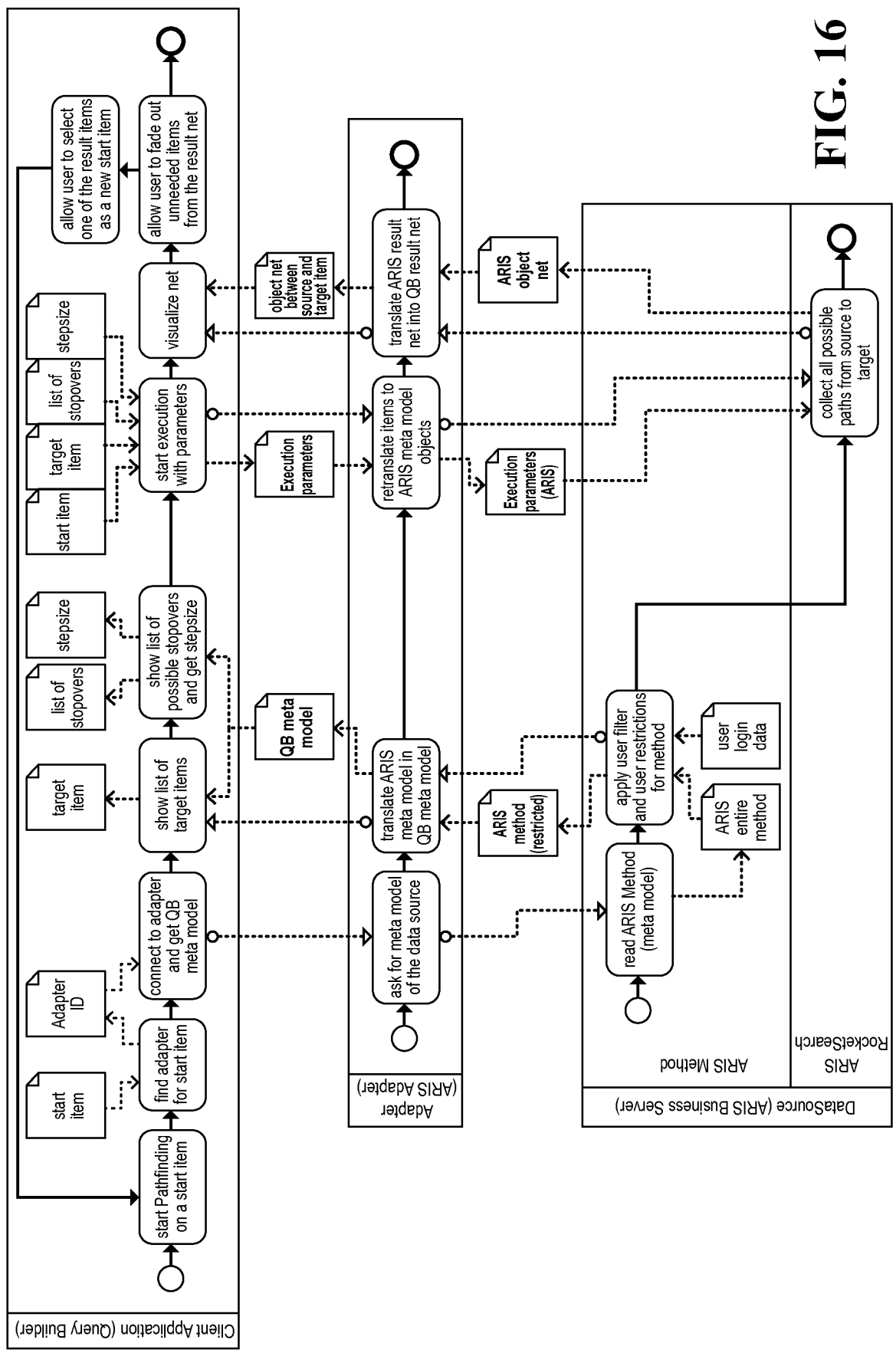
FIG. 16 is a schematic view of an example architecture supporting the path finder techniques disclosed herein in the ARIS scenario in accordance with certain example embodiments.

FIG. 16 is a schematic view of an example architecture supporting the path finder techniques disclosed herein in the ARIS scenario in accordance with certain example embodiments. It is again noted that the example path finder approaches set forth herein, although discussed in connection with the ARIS Platform, can also be applied to other data sources. Certain example embodiments interpret methodic and concrete objects as simple path finder items, handling items and the follower relation between the items, independent of the type of the corresponding objects in the data source. This generic approach helps ensure that the concept can also be applied to other data sources, at least in certain example embodiments. The translation between the specific data source and the path finder may be performed in connection with one or more suitably configured adapters or the like. These adapters may know the meta model and the methodology of the data source, but this information may be transparent to a user.

The data flow in the FIG. 16 example describes the steps of the definition of path finding in the case that the process is started on a concrete object. This could be performed, for example, by offering a functionality in a context menu to start the path finder techniques on a concrete object in the modeling tool in certain example embodiments.

Based on this preselected source item, the corresponding adapter for the item is determined. A reference to this adapter is obtained in order to access the associated data. When the user starts typing the name of the target object, the adapter may be asked for a list of matching objects, both methodic and concrete. The same may happen if the user wants to add stopovers. This suggestive functionality may aid the user's selection of objects, etc.

After having selected the source and target items, the stopovers and the maximum step size, the path finding may be started. These four parameters may be sent to the adapter for further execution. The adapter then delivers a tree or other appropriate data structure (such as, for example, an array, etc.) of the found concrete paths that is then made visual. The user can now fade out paths from the result net, start a new path finding on one of the result items (e.g., as a concatenation), etc.

The adapter may be thought of as being an abstraction layer for the concrete data source. It therefore may be responsible for the translation from data that comes from the path finder into the terms of the data source, and vice versa. In some cases, it is not necessary to implement other logic on the adapter.

FIG. 16 shows a scenario where a path finder executes in the ARIS platform, and the ARIS Business Server is used as a data source. This approach can of course be adapted to other data sources in other example embodiments.

As indicated above, ARIS uses method filters to reduce the complexity of the methodology. Some of these filters are preconfigured, although users can define their own filters. These filters primarily contain the parts of the methodology that is covered by the modeling conventions. This implies that all objects, concrete and methodic, that are transferred to a path finder are already filtered. This also implies that, advantageously, no objects will be offered as source, target, stopover or result item, that are not allowed by this filter.

The execution of a path finding in ARIS may be based on a search engine contained in the ARIS Business Server. The execution thus may be performed in three phases. A search engine inside the ARIS Business Servers allows finding nets of concrete objects in the database by a given pattern on the methodic level. Therefore, in the first phase the search pattern is created.

First, execution parameters that reference to concrete objects are replaced by their corresponding methodic objects. Consider the following example. The source, target, and stopover execution parameters for a path finder are "Maria Lopez" (a concrete object), "Function" (a methodic object), and "Sales employee" (a concrete object). These objects are translated into "Person" (a methodic object), "Function" (a methodic object), and "Role" (a methodic object), as corresponding source, target, and stopover objects.

After the translation of the execution parameters to methodic objects, all allowed paths between source and target object are searched on the methodic level, considering step size and also possible stopovers. These paths will build the pattern used for the search of the concrete objects. It will be appreciated that, at this point, the additive approach of existing solutions is in essence performed by automatically and programmatically (e.g., by the system) and not by a human user. The result of this step may be thought of as a simple pattern on the methodic level. A complex search engine implemented in the ARIS platform then may use this pattern to very efficiently find the concrete results. In other words, the additive approach is more or less hidden from the user. FIG. 16 shows how the ARIS Rocket Search System can return this net, based on the input pattern provided, although there are other known tools that could be used by one skilled in the art to return a net of objects. A search engine may reveal all steps in the net that lead to the target, based on the pattern obtained after translation of the execution parameters.

As alluded to above, any suitable algorithm may be used to perform such net-building and search functionalities. See, for example, EP Application No. 12 192 187.8, filed 12 Nov. 2012, the entire contents of which are hereby incorporated herein by reference. One example algorithm starts on the methodic source item, and an iterative method searches all paths on the methodic level, from source to target. In each iteration step, all possible followers on the methodic level are added to the path. If the maximum step size is reached and the target object is not yet reached, then the path is ignored. If the maximum step size is not yet reached but the target is already reached, then the path is only added if all stopovers can be found on the path. Otherwise the path will be ignored. FIG. 17 is a code extract that represents a path finding strategy that may be used in accordance with certain example embodiments. It is noted that breadth first search and depth first search algorithms, for example, may be used for searching within an extracted net.

In the example below, the list of possible paths for step size=2 could contain the following paths:

- Person -has Role-> Role -carries out-> Function
- Person -has Role-> Role -supports-> Function
- Person -substitutes-> Person -has Role-> Role-supports-> Function
- . . .

This search pattern, together with the source item (concrete object), is transferred to the search engine in the second phase. This pattern search engine builds up a net of concrete objects. In the example, the result net could be:

- Maria Lopez -has Role-> Sales employee -carries out-> Send mail
- Maria Lopez -has Role-> Sales employee -carries out-> Prepare offer
- Maria Lopez -substitutes-> Marc Miller -has Role-> Sales employee -carries out-> Approve offer
- . . .

As the input for the search engine is only the concrete source object and the methodic pattern, the result paths will only consider stopovers on the methodic level. If there are stopovers defined by concrete items, all paths may have to be checked, and paths without the concrete stopovers may have to be removed from the result net or otherwise handled.

After these steps the result net is again translated by the adapter into the Path finder Meta Model and transferred to the client part.

It will be appreciated that the techniques disclosed herein may be carried out in connection with a computer system including processing resources such as, for example, at least one processor and a memory. The computer systems may in some cases include displays on which user interfaces can be displayed. The user interfaces may be configured to receive input from the user to specify source and target objects, limiting criteria, etc. The adapters backing the system may be transparent to the user in certain example embodiments and, as alluded to above, may be tailored to the data source(s) from which data is to be drawn.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

The following table may be of use in understanding certain example embodiments. It is noted, however, that the scope of the invention should not be limited by the entries in this table, unless such functionality is specifically claimed.

| | |
|---|---|
| Ad hoc analysis | Analysis performed by an end user, navigating through a net of concrete items and their relations using a meta model, defined by the adapters, and/or using query definitions that are created in the background of the analysis. |
| BPM Tools | Tools associated with Business Process Management functions including, for example, tools useful in the modeling of business processes, measuring or simulation of business processes and also documentation and publishing of them, etc. |
| EPC | The event-driven process chain, which is a graphical modeling notation for business processes. |
| Item | An entity type from the data source that carries item information and has relationships to other items (e.g. Model, or object in ARIS, analysis object in Business Optimizer, etc). The item may be seen in the result. |
| Item/Object (Concrete) | A concrete item is the instance of an entity type (e.g., Mister X as a specific person in the database). |
| JavaScript | A dynamic prototype-based scripting language. |
| KPI | A performance indicator or key performance indicator (KPI) refers to data for performance measurement. |
| Step | Associated with a relation construct, that another item (which is different from the source or target), concrete or otherwise, has; a relation to source and target, or to source and a step, or a step and target, or even two other steps. |
| Stopover | An item that must be on a path between the source and the target. |
| SQL | Structured Query language is a programming language designed for managing data in relational database management systems. |
| XML | Extensible Markup Language is a markup language that defines a set of rules for encoding documents in a format that is both human-readable and machine-readable. |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A path finding method performed by an information processing system comprising at least one processor, the path finding method being executed on a computer-represented model comprising a plurality of computer-represented objects including concrete level objects and methodic-level objects, the computer-represented model being defined in accordance with a modeling convention and including a plurality of layers, the plurality of layers including a first layer describing what kind of computer-represented objects and/or connections are usable in the computer-represented model, the second layer defining the methodic-level objects, and a third layer defining the concrete-level objects, the path finding method facilitating data mining of information relating to the objects and/or relationships between objects represented by the model, the method comprising:

receiving, from a user and via a user interface, input specifying a source object, a target object, a maximum step size, and at least one stopover item that must be present between the specified source object and the specified target object;

developing a net representing at least all methodic-level objects in the model between the source and target objects and concrete-level objects in the model between the source and target objects, each of the methodic-level objects being a step of at least one path between the source and target objects and each of the concrete-level objects being a step of at least one path between the source and target objects, and all relationships between the concrete-level objects and the methodic-level objects in the model by connections between the concrete-level objects and the methodic-level objects, wherein each said concrete-level object is an instance of an associated methodic-level object;

compiling a list of paths, through the net, from the source object to the target object, each said path having a path length associated therewith, each path including the one or more steps corresponding to the methodic-level objects, the one or more steps corresponding to the concrete-level objects, the one or more specified stopover items that must be present between the specified source object and the specified target, and the path length of each path in the list determined by the steps corresponding to the methodic-level objects and the concrete-level objects being less than the specified maximum step size;

following said compiling of the list of paths, displaying on a display the compiled list of paths to the user in text-based and/or graphical form and a filter list indicating model types, object types, attributes of objects, and/or relationship types in the developed net to enable the data mining without requiring the user to have detailed knowledge of the model and/or without requiring the user to input search queries using a predetermined technical scripting format, to provide consistent and repeatable results within a single modeling environment used to model the computer-represented model;

receiving, from the user via the user interface, input specifying one or more user-specified filters from the filter list;

excluding, from the list of paths and in connection with the at least one processor, individual ones of said paths that fail to meet the one or more user-specified filters; and following said excluding and without the user having to make an adaptation to the computer-represented model or the modeling convention, updating the displayed list of paths to the user in text-based and/or graphical form to take into account updates thereto resulting from the excluding and further facilitate the data mining without requiring the user to have detailed knowledge of the model and/or without requiring the user to input search queries using a predetermined technical scripting format, to generate updated consistent and repeatable results within the single modeling environment used to model the computer-represented model.

2. The method of claim 1, wherein each said path includes only concrete-level objects, the concrete-level objects existing at a level above a meta model level associated with the model, and above a model level that is built on the meta model level.

3. The method of claim 1, wherein the source object is specifiable only as a concrete-level object.

4. The method of claim 3, wherein the target object is specifiable as a concrete-level object or as a methodic-level object.

5. The method of claim 1, wherein the target object is specifiable as a concrete-level object or as a methodic-level object.

6. The method of claim 1, wherein the source object is specifiable as a methodic-level object.

7. The method of claim 6, further comprising when the source object is specified as a methodic-level object, generating a new concrete-level object representing the source object, to facilitate graphical representation of the source object in a generated graphical form presentation of the list of paths.

8. The method of claim 1, wherein each said stopover item is one of a concrete-level object and a methodic-level object.

9. The method of claim 1, further comprising:
maintaining a store of user-excluded paths; and
adding back one or more previously-excluded paths by consulting the store upon a corresponding user request.

10. The method of claim 1, further comprising concatenating multiple paths by using the target object of a first path as a source object for the second path.

11. The method of claim 1, wherein the paths are each directed.

12. A non-transitory computer readable storage medium tangibly storing a program for analyzing a computer-represented model comprising a plurality of computer-represented objects including concrete level objects and methodic-level objects, the computer-represented model being defined in accordance with a modeling convention and including a plurality of layers, the plurality of layers including a first layer describing what kind of computer-represented objects and/or connections are usable in the computer-represented model, the second layer defining the methodic-level objects, and a third layer defining the concrete-level objects, analyzing the computer-represented model facilitating data mining of information relating to the objects and/or relationships between objects represented by the model, the program comprising instructions that, when executed by at least one processor of a system, cause the system to at least:

receive, from a user and via a user interface, input specifying a source object, a target object, a maximum step size, and at least one stopover item that must be present between the specified source object and the specified target object;

develop a net representing at least all methodic-level objects in the model between the source and target objects and concrete-level objects in the model between the source and target objects, each of the methodic-level objects being a step of at least one path between the source and target objects and each of the concrete-level objects being a step of at least one path between the source and target objects, and all relationships between the concrete-level objects and the methodic-level objects in the model by connections between the concrete-level objects and the methodic-level objects, wherein each said concrete-level object is an instance of an associated methodic-level object;

compile a list of paths, through the net, from the source object to the target object, each said path having a path length associated therewith, and each path including the one or more steps corresponding to the methodic-level objects, the one or more steps corresponding to the concrete-level objects, the one or more specified stopover items that must be present between the specified source object and the specified target and the path length of each path in the list determined by the steps corresponding to the methodic-level objects and the concrete-level objects being less than the specified maximum step size;

following said compiling of the list of paths, display on a display the compiled list of paths to the user in text-based and/or graphical form and a filter list indicating model types, object types, attributes of objects, and/or relationship types in the developed net to enable the data mining without requiring the user to have detailed knowledge of the model and/or without requiring the user to input search queries using a predetermined technical scripting format, and to provide consistent and repeatable results within a single modeling environment used to model the computer-represented model;

receive, from the user via the user interface, input specifying one or more user-specified filters from the filter list;

exclude, from the list of paths and in connection with the at least one processor, individual ones of said paths that fail to meet the one or more user-specified filters; and following said excluding, and without the user having to make an adaptation to the computer-represented model or the modeling convention, update the displayed list of paths to the user in text-based and/or graphical form to take into account updates thereto resulting from the excluding and further facilitate the data mining without requiring the user to have detailed knowledge of the model and/or without requiring the user to input search queries using a predetermined technical scripting format, to generate updated consistent and repeatable results within the single modeling environment used to model the computer-represented model.

13. A computer system, comprising:

processing resources including at least one processor and a memory;

a display;

a data source storing a computer-represented model comprising a plurality of computer-represented objects including concrete level objects and methodic-level objects, the computer-represented model being defined in accordance with a modeling convention and including a plurality of layers, the plurality of layers including a first layer describing what kind of computer-represented objects and/or connections are usable in the computer-represented model, the second layer defining the methodic-level objects, and a third layer defining the concrete-level objects, the path finding method facilitating data mining of information relating to the objects and/or relationships between objects represented by the model; and a user interface configured to receive input specifying a source object, a target object, a maximum step size, and at least one stopover item that must be present between the specified source object and the specified target object in the model;

wherein the processing resources are controllable to at least:
  develop a net representing at least all methodic-level objects in the model between the source and target objects and concrete-level objects in the model between the source and target objects, each of the methodic-level objects being a step of at least one path between the source and target objects and each of the concrete-level objects being a step of at least one path between the source and target objects, and all relationships between the concrete-level objects and the methodic-level objects in the model by connections between the concrete-level objects and the methodic-level objects, wherein each said concrete-level object is an instance of an associated methodic-level object;

compile a list of paths, through the net, from the source object to the target object, each said path having a path length associated therewith, each path including the one or more steps corresponding to the methodic-level objects, the one or more steps corresponding to the concrete-level objects, the one or more specified stopover items that must be present between the specified source object and the specified target, and the path length of each path in the list determined by the steps corresponding to the methodic-level objects and the concrete-level objects being less than the specified maximum step size;

following said compiling of the list of paths, display on the display the compiled list of paths to the user in text-based and/or graphical form and a filter list indicating model types, object types, attributes of objects, and/or relationship types in the developed net to enable the data mining without requiring the user to have detailed knowledge of the model and/or without requiring the user to input search queries using a predetermined technical scripting format, to provide consistent and repeatable results within a single modeling environment used to model the computer-represented model;

receive, from the user via the user interface, input specifying one or more user-specified filters from the filter list;

exclude, from the list of paths, individual ones of said paths that fail to meet the one or more user-specified filters; and following said excluding and without the user having to make an adaptation to the computer-represented model or the modeling convention, update the displayed list of paths to the user in text-based and/or graphical form on the display to take into account updates thereto resulting from the excluding and further facilitate the data mining without requiring the user to have detailed knowledge of the model and/or without requiring the user to input search queries using a predetermined technical scripting format, to generate updated consistent and repeatable results within the single modeling environment used to model the computer-represented model.

14. The system of claim 13, wherein the source object is specifiable only as a concrete-level object, and wherein the target object is specifiable as a concrete-level object or as a methodic-level object.

15. The system of claim 13, wherein the processing resources are further configured to generate a new concrete-level object representing the source object when the source object is specified as a methodic-level object.

16. The system of claim 13, further comprising a store of user-excluded paths,
  wherein the processing resources are further configured to add back one or more previously-excluded paths by consulting the store upon a corresponding user request received via the user interface.

17. The system of claim 13, wherein the processing resources are further configured to concatenate multiple paths by using the target object of a first path as a source object for the second path.

18. The system of claim 13, further comprising an adapter configured to interface with a sub-system maintaining the model in a manner that is transparent to the user.

19. The system of claim 13, further comprising a plurality of adapters, and
wherein the processing resources are further configured to identify which adapter should be consulted in order to retrieve specific data associated with the model or a portion thereof.

20. The system of claim 19, wherein the adapters are configured to return trees representing found paths, the trees being interpretable by the processing resources and usable to construct visual representations.

21. The method of claim 1, wherein:
the source object and the target object are both specified as methodic-level objects.

22. The method of claim 1, wherein:
the source object and the target object are both specified as concrete-level objects.

23. The method of claim 1, wherein different types of relationships between the concrete-level objects and the methodic-level objects in the model are provided in the net, and in response to a user input via the user interface removing one or more types of relationships represented in the developed net, excluding connections corresponding to the removed types of relationships and excluding from the list of paths said paths that are no longer provided in the net.

24. The computer system of claim 13, wherein the computer-represented objects are modeled in Business Process Management (BPM) tools.

25. The computer system of claim 13, wherein the second layer includes Event-driven Process Chain (EPC) model defining at least a subset of the methodic-level objects.

26. The computer system of claim 13, wherein the single modeling environment enables visualization of the information relating to the objects and/or the relationships between objects defined by a plurality of different models included in different and/or the same layers of the plurality of layers in the computer-represented model.

27. The computer system of claim 26, wherein the single modeling environment uses ARTS methodology and the different models include a Business Process Management (BPM) based model and an EPC based model.

* * * * *